(12) United States Patent
Steeg et al.

(10) Patent No.: US 7,393,030 B2
(45) Date of Patent: Jul. 1, 2008

(54) POLYMER ENERGY ABSORBER FOR MOTOR VEHICLES AND BUMPER SYSTEM

(75) Inventors: Claus-Christian Steeg, Oelsnitz (DE); Holm Riepenhausen, Rehau (DE); Elmar Kühl, Hardthausen (DE)

(73) Assignee: Rehau AG & Co., Rehau (DE)

( * ) Notice: Subject to any disclaimer, the term of this patent is extended or adjusted under 35 U.S.C. 154(b) by 177 days.

(21) Appl. No.: 10/527,985

(22) PCT Filed: Sep. 5, 2003

(86) PCT No.: PCT/EP03/09853

§ 371 (c)(1),
(2), (4) Date: Mar. 21, 2005

(87) PCT Pub. No.: WO2004/028880

PCT Pub. Date: Apr. 8, 2004

(65) Prior Publication Data

US 2005/0269824 A1    Dec. 8, 2005

(30) Foreign Application Priority Data

Sep. 19, 2002    (DE) ................................ 102 43 460

(51) Int. Cl.
*B60R 19/34*    (2006.01)
(52) U.S. Cl. .................... 293/133; 296/187.09; 293/120
(58) Field of Classification Search ................ 293/132, 293/133, 120, 121, 122; 296/187.09; 267/140, 267/152; 188/371, 374, 375, 376
See application file for complete search history.

(56) References Cited

U.S. PATENT DOCUMENTS

| 3,779,591 | A | * | 12/1973 | Rands | ......................... 293/133 |
| 3,893,726 | A |  | 7/1975 | Strohschein | |
| 4,601,367 | A | * | 7/1986 | Bongers | ..................... 188/377 |
| 5,074,391 | A |  | 12/1991 | Rosenzweig | |
| 5,875,875 | A | * | 3/1999 | Knotts | ......................... 188/374 |
| 6,505,820 | B2 | * | 1/2003 | Sicking et al. | ............. 256/13.1 |
| 6,601,886 | B1 | * | 8/2003 | Thayer | ........................ 293/133 |
| 6,957,727 | B2 | * | 10/2005 | Leung | ........................ 188/371 |

FOREIGN PATENT DOCUMENTS

| DE | 2509265 | 9/1975 |
| DE | 3232940 | 3/1984 |
| DE | 3833048 | 4/1990 |
| DE | 42 06 780 A1 | 9/1992 |
| DE | 4401805 | 8/1994 |
| DE | 196 23 449 A1 | 1/1998 |

(Continued)

OTHER PUBLICATIONS

Notification of the First Office Action (PCT Application in the National Phase) dated Sep. 8, 2006 Issued in Application No. 03822246.9.

*Primary Examiner*—Jason S Morrow
(74) *Attorney, Agent, or Firm*—Venable LLP; Robert Kinberg

(57) ABSTRACT

The invention relates to a polymer energy absorber and a bumper system for motor vehicles, said system absorbing the kinetic energy released during collisions with motor vehicles. According to the invention, polymer energy absorbers are integrated into a bumper system.

33 Claims, 7 Drawing Sheets

FOREIGN PATENT DOCUMENTS

| | | |
|---|---|---|
| DE | 196 23 449 A1 | 1/1998 |
| DE | 19806541 | 9/1998 |
| DE | 197 17 473 A1 | 11/1998 |
| DE | 198 12 579 A1 | 9/1999 |
| DE | 10015294 | 10/2001 |
| EP | 0 497 142 A2 | 8/1992 |
| FR | 2 777 251 A1 | 10/1999 |
| FR | 2 789 358 A1 | 8/2000 |
| JP | 57-40136 A | 3/1982 |

\* cited by examiner

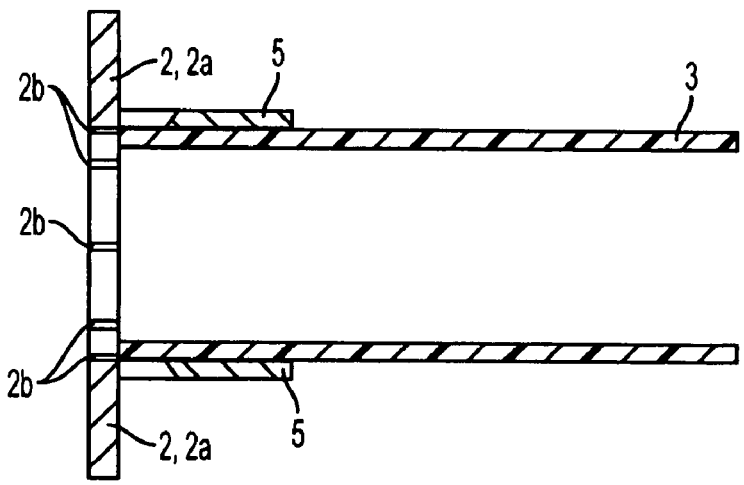
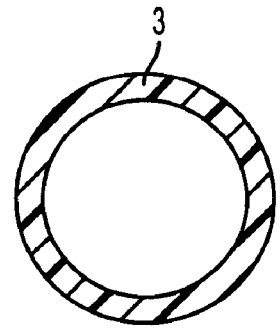
FIG. 2C
FIG. 2A
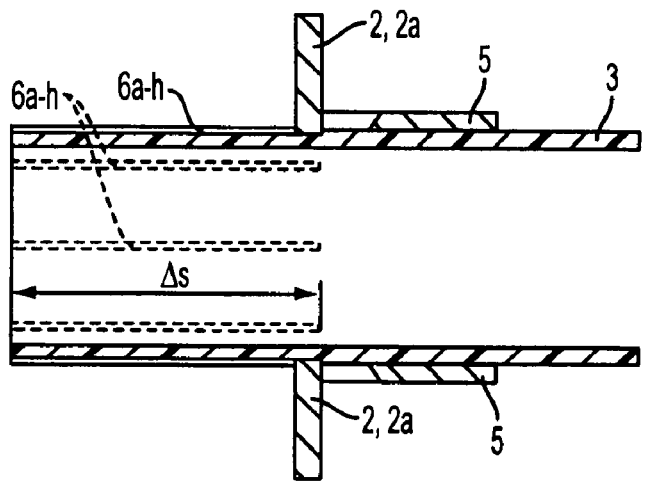
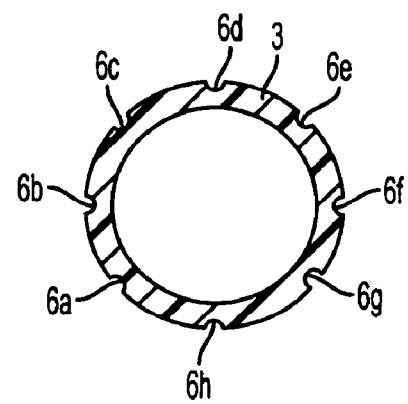
FIG. 2B
FIG. 2D
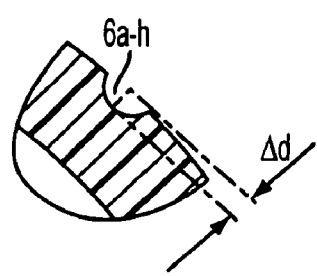
FIG. 2E

POLYMER ENERGY ABSORBER FOR MOTOR VEHICLES AND BUMPER SYSTEM

BACKGROUND

1. Field of Invention

The invention relates to a polymer energy absorber for motor vehicles which absorbs the kinetic energy released during collisions between motor vehicles and purposely discharges this energy. For this, the polymer absorber is installed in bumper systems and/or bumper arrangements of motor vehicles.

2. Related Art

Prior art discloses different types of energy absorbers which are presently used in the front and/or rear bumper areas of motor vehicles. These energy absorbers have different energy absorption capacities, owing to differences in material and design, as well as differences in the energy-absorption behavior for crash speeds in the typical range of 5 to 15 km/h. As a result of the spaces available for installing energy absorbers in the front and rear motor vehicle region, motor vehicle manufacturers prefer systems having an optimum force-distance characteristic for absorbing kinetic energy at the moment of collision, starting with an initially steep force increase with continuing energy absorption over time, which leads to a constant force level, so that the integral $\int F^*ds$ reaches a maximum value for the force-distance characteristic curve. Reversible and irreversible energy absorber systems for motor vehicles are described in prior art. Hydraulic damping elements are one example of reversible energy absorbers which show a differing response behavior during crashes, depending on the medium used. These hydraulic damping elements have a complex technical design and their weight does not meet the requirements of present-day motor vehicle manufacturers. With respect to the irreversible effect, arrangements consisting of plastically deformable metal elements, e.g. hollow profiles with metal foam (aluminum foam), are known for use as motor vehicle energy absorbers, wherein the energy absorption behavior is mainly determined by the density of the metal foam filler. The production of these irreversible energy absorbers is expensive and involved.

In this connection, prior art also discloses systems combining reversible and irreversible energy absorber elements.

Furthermore known are different types of energy absorbers for motor vehicles which have a differing energy-absorption capacity and are used in a bumper system between the frame side rail and the bumper support in the form of so-called crash boxes or type-damage prevention devices. Besides the bumper support, the crash boxes also absorb crash energy and are irreversibly changed by the deformation. These energy absorbers function to protect the vehicle structure and discharge the crash energy during a collision for speeds up to 15 km/h.

Reference DE 2509265 C2 discloses the use of honeycomb-type deformation elements of plastic or metal which are attached to the bumper. These deformation elements are installed in longitudinal direction of the vehicle and absorb the peak force generated during a crash situation with the aid of the honeycomb structure, so as to dissipate the energy. The technical production of the honeycomb structure in the different types of materials as well as the connection technology are a disadvantage of this design, particularly when using polymer materials, because it results in high production costs and a less secure connection to the receiving elements in the bumper unit of future motor vehicles, given the predetermined installation situation.

Reference DE 3833048 C2 discloses a different energy-absorbing element for the dynamic absorption of crash energy during a vehicle collision phase. This arrangement consists of profile-extruded crash tubes of a composite fiber material with a matrix material from the group of epoxy resins, phenol resins, or vinyl ester resins, wherein these tubes are combined form-locking and coaxial to each other with the vehicle chassis. The disadvantage of this arrangement lies in the reduced force absorption if the vehicle is impact-stressed in vehicle longitudinal direction because of the spatial arrangement of the crash tubes.

Reference DE 4401805 A1 discloses crash dampers with speed-dependent energy conversion. These crash dampers contain fluid-filled pressure chambers for the energy conversion which deform the fluid-filled crash damping elements in longitudinal direction during a vehicle collision and effect an energy dissipation through the compression recovery effect of the selected fluid. The disadvantage of this design lies in the weight of the fluid-filled crash dampers.

A reversible deformation element is described in reference DE 10015294 C2 which discloses a device for absorbing impact energy by means of a tubular sleeve which is provided with an elastic collar that encloses the tube and is composed of a shape-memory alloy and which acts based on the physical memory effect. In the event of an impact, the collar fitted around the outside is expanded in radial direction and the material memory effect then counteracts the collar expansion with a time delay because of the shape-memory alloy characteristic, so that the deformation energy is dissipated slower. The radial and time-delayed energy absorption on the whole results in a lower response behavior of the energy absorber unit during a crash which, combined with the high material costs for the shape-memory alloy, does not meet the future requirements of motor vehicle manufacturers.

A bumper for motor vehicles is furthermore disclosed in reference DE 3232940 C2 which consists of a section that is rigidly attached to the vehicle and is provided with rigid support elements and bent end regions on the side, wherein an undulating plate spring is installed in front of this section. The plate spring and support unit form a single unit made of plastic.

Reference DE 19806541 A1 furthermore discloses a bumper system containing synthetic foam layers with different densities, wherein the energy absorption behavior is realized on two force levels, meaning it transfers an impact resulting from a crash to two different energy absorption levels.

In addition to the aforementioned disadvantages in prior art, the energy absorbers used so far in motor vehicles display an irregular energy absorption behavior, combined with a lower average energy absorption which results in a time delay in the force-distance behavior and, on the whole, negatively influences the response behavior of the energy absorbing unit. Also proposed are energy-absorbing systems for motor vehicles which do not meet the weight requirements of future motor vehicle generations.

Future technical requirements for energy absorbers and energy systems used in motor vehicles must meet the following factors:

high efficiency of the system in the event of a collision;

increasingly smaller installation space;

high reproducibility of the energy conversion;

easy assembly for a replacement or exchange;

stability to climatic influences and recycling ability.

SUMMARY OF THE INVENTION

It is therefore an object of the present invention to improve the above-described disadvantages in prior art and to create an energy absorber for motor vehicles which meets future requirements for energy absorption behavior, so that the kinetic energy generated during a collision in the front or rear region of the motor vehicle can be dissipated over a minimum space.

This system should have a simple structural design and should be able to optimally discharge the forces acting upon it from the outside during a collision, thereby ensuring the protection of the supporting structure for the frame/chassis for crash speeds up to 20 km/h.

An energy absorber for motor vehicles was discovered which meets the aforementioned requirements of high efficiency in case of a collision despite an increasingly smaller installation space, combined with a high reproducibility of the energy conversion, which is stable over long periods of time against climatic influences and also ensures a cost-effective replacement/exchange while meeting recycling requirements. Also discovered in connection with this invention was a bumper system which improves the dissipation and purposely dissipates kinetic energy in the speed range of up to 20 km/h for collision damage along a predetermined energy absorption distance, as compared to known systems, owing to the fact that the energy absorber is installed at a distance to the side and together with its special shape and the connection to the support structure of the motor vehicle.

The subject matter of the present invention is a polymer energy absorber for motor vehicles, composed of polymer material in the shape of a tube and comprising a number of chip-removing elements arranged thereon. The chip-removing elements are arranged form-locking and material-to-material around the periphery of a central opening in a metal base plate with flange, thereby enclosing the polymer material tube frictionally adhering. In the event of a crash, the chip-removing elements absorb energy through the removal of material chips in longitudinal direction of the polymer tube surface.

Tube-shaped thermoplastic or duroplastic materials are used for the energy absorber according to the invention, depending on the technical specifications such as vehicle weight, available installation space, and vehicle type.

It is preferable if one of the materials from the group of polyvinylchlorides (PVC), polyethylenes (PE), polypropylenes (PP), polyamides (PA), polycarbonates (PC), polyethyleneterephthalates (PET), polybutyleneterephthalates (PBT), polymethylmethacrylates (PMMA), polyoxymethylenes (POM), styrene copolymerizates (acryl-nitrile-styrene-butadiene-copolymer and copolymer of styrene and acrylnitrile), as well as blends thereof (ABS/PC and PBT/PC) or of high efficiency polymer materials such as polyetherketones (PEK, PEEK), polyamides, as well as copolymers is used for the tube-shaped polymer material energy absorber.

According to one advantageous embodiment, mixtures of the aforementioned types of polymers are also used as material for the tube-shaped polymer energy absorber for motor vehicles. According to one advantageous modification, the admixture of inorganic filler materials such as chalk, talcum, carbon fibers, glass fibers, mica, silicates, aluminum nitrite and aluminum silicate and metal micro particles critically influences the solidity and rigidity of the polymer material tube for the energy absorber according to the invention. The share of inorganic filler materials is in the range of 3 to 40% by weight, relative to the mol weight of the polymer material that is used for the energy absorber.

Particularly preferred according to a different embodiment are nano-particle fillers such as $TiO_2$, soot, silicic acid and clay minerals with particle sizes ranging from 80-150 nm and which are present in weight percentages of 3-15, relative to the mol weight of the tube-shaped polymer material used for the energy absorber. These particles are added to the polymer materials disclosed.

A broad spectrum of polymer materials is thus available for producing the energy absorber according to the invention which determines the energy absorption behavior during a crash, together with the structural design of the chip-removing elements.

The polymer energy absorber tube has an external diameter between 4 and 10 cm and a tube-wall thickness ranging from 0.5 to 10 cm (corresponding to full material strength) while the total tube length (equal to the absorption distance) is in the range of 35 to 200 mm, corresponding to an energy-absorption capacity of up to 20 kJ.

The total tube length for one preferred embodiment of the energy absorber polymer tube ranges from 100-170 mm, and depends on the structurally predetermined space for the installation inside the motor vehicle, the energy to be absorbed, and the dimensioning for crash speeds of up to 20 km/h.

A different advantageous embodiment of the invention provides for a multi-layer composition of the energy absorber tube of polymer materials, wherein several layers, but at least two, of the same and/or different layer thickness and composed of the same and/or different polymer materials are used for this.

The single polymer layer can be either polyvinylchloride (PVC), polyethylene (PE), polypropylene (PP), polyamide (PA), polycarbonate (PC), polyethylene-terephthalate (PET), polybutyleneterephthalate (PBT), polymethylmethacrylate (PMMA), polyoxymethylene (POM), styrenecopolymerizate (acrylnitrile-styrene-butadiene-copolymer and copolymer from styrene and acrylnitrile), as well as blends thereof (ABS/PC and PBT/PC), or high-efficiency polymers such as polyetherketone (PEK, PEEK), polyamide, as well as their copolymers.

The density of the various thermoplastic and/or duroplastic materials used for the multi-layer composition of the polymer energy absorber ranges from 0.82 to 1.48 $g/cm^3$.

To improve the shearing force resistance of the energy absorber according to the invention, metal inlays and/or fabric reinforcements (gauze) are added to the complete or partial surface of an inner support layer, even with a multi-layer design (see e.g. FIGS. 7 and 8). The metal inlays and/or fabric reinforcements additionally result in a reduction of the heat expansion of the polymer energy absorber tube and ensure its form stability against climatic influences. The metal inlays and/or fabric reinforcements furthermore ensure the form stability of the polymer energy absorber tube in the event of a crash.

Also conceivable in this connection is the coating of a tube-shaped basic body of metal with the aforementioned polymer layers. The deposited polymer layers then take on the function of an energy-absorbing chip-removal layer which can be used as hybrid polymer energy absorbers.

In principle, the shape of the energy absorber according to the invention is not limited to tube-shaped elements. Also conceivable are elements with circular, U-shaped, trapezoid, rectangular or elliptical geometric cross sections.

The tube-shaped polymer energy absorber for motor vehicles, including the energy absorber coated with a polymer material, can be produced easily and cost-effectively with the extrusion, co-extrusion and/or injection-molding technique.

The absorption of crash-energy in the range of 2 to 20 kJ for crash speeds of up to 20 km/h is achieved by using a light-weight, tube-shaped polymer material for the energy absorber and by using chip-removing elements, arranged form-locking and material-to-material around the periphery of the central opening in the metal base plate with flange, such that the polymer tube is frictionally enclosed. The energy is absorbed through the removal of material by means of the chip-removing elements in longitudinal direction of the polymer tube surface of the energy absorber according to the invention.

The energy absorption depends on the polymer material that is used, as well as the number, geometric shape, and cutting depth/penetration depth of the chip-removing elements. The chip-removing elements, in connection with the tubular polymer material for the energy absorber according to the invention, thus influence the energy absorption to a high degree. In particular, the force-distance characteristics, meaning viewed integrally the energy absorption, can be adjusted by adjusting the number and shape of the chip-removing elements in a variable energy-absorption range of up to 20 kJ, so as to take into consideration the different motor vehicle factors such as motor weight and available space for the installation.

It is also conceivable according to the invention to have an arrangement where the chip-removing elements are effective along the tube-shaped inside surface of the polymer energy absorber or to use a combination arrangement where these elements act upon the outside as well as the inside surface. In that case energy is absorbed in axial direction along the inside surface and/or along the outside and inside surface of the combination arrangement of the polymer energy absorber.

The number of chip-removing elements ranges from 4 to 40, wherein experiments have proven that it is particularly advantageous to have 8 to 16 chip-removing elements, arranged symmetrical and equidistant around the periphery, wherein this symmetrical and equidistant arrangement of a first embodiment of the invention should not be viewed as limiting.

The spacing between individual chip-removing elements ranges from 2.5 to 25%, relative to the external or internal periphery of the polymer energy absorber tube, and depends on the number, the length, and the selected arrangement for the chip-removing elements.

The chip-removing elements have a rectangular, triangular, trapezoid, polygonal and/or semi-circular shape and form a chip-removing angle of 45-90 degrees, relative to the normal for the external or internal surface of the polymer energy absorber tube.

Various crash experiments and simulations revealed a preferred length of 0.5-3 cm for the chip-removing elements, adapted to the wall thickness of the polymer energy absorber tube, which made it possible to achieve material penetration depths $\Delta d$ of 0.15 to 1.5 cm for a crash event. FIG. 4 shows an example of the ratio of force level to material removal on the surface for a polymer energy absorber made from polyamide. In this case, a force level of 70 kN will result in removing by means of chip removal a total surface of 320 mm$^2$ from the polymer energy absorber tube according to the invention. The ratio of force level to surface condition in this connection shows for force levels in the range of 10 to 90 kN a linear dependence for the material removal on the surface, caused in this case by eight chip-removing elements.

The materials used for the chip-removing elements are metals such as aluminum, titanium, iron and the like or metal alloys or ceramics.

A metal guide sleeve, which can also be a plastic or plastic/metal sleeve, on the whole permits only an axial movement of the polymer energy absorber tube because of the one-piece connection to the base plate with flange and functions as momentary support during a crash event.

An object of the invention furthermore relates to a bumper system for motor vehicles. The bumper system includes at least two energy absorbers according to the invention, and is installed in front of the vehicle frame side rails, depending on the existing vehicle installation situation. The polymer energy absorbers are attached form-locking and/or frictionally adhering by means of a flange on the base plate for the energy absorber to the vehicle frame which is positioned behind. As a result, it is ensured that the connection can be severed and re-established for dismantling and/or installation purposes, wherein fastening elements are used, for example, for the connection to the frame side rail.

According to one advantageous modification of the bumper system, the energy absorber is integrally formed onto the bumper support, wherein the polymer tube for the energy absorber is connected to the bumper support either form-locking and material-to-material or form-locking and frictionally adhering, depending on the design specifications.

The one-piece bumper system according to the invention in connection with the polymer energy absorber makes it possible to optimize the design from a cost point of view, including the associated components, thus reducing the total production costs. Especially advantageous is the easy factory installation on the motor vehicle during the production and/or the easy reassembly during repairs as a result of the simple design. In addition, the bumper system meets the requirements of motor-vehicle manufacturers with respect to a decreasing installation space and simultaneously improved and reproducible energy absorption.

In particular the different lengths selected for a polymer energy absorber, adapted to the different motor vehicle types, therefore ensures an optimum use of the predetermined installation spaces. The option of using different types of polymer materials for the energy absorber according to the invention, in connection with the bumper system, leads to a reduction in the motor vehicle weight without reduction in the safety features required for accident situations.

Even taking into consideration environmental aspects and international recycling requirements, the proposed invention has advantages since the polymer materials used can be recycled as part of a motor-vehicle part disposal operation.

In principle, it must be noted that the invention can also be used for the rear region of a motor vehicle.

In the following, the invention is explained in further detail with the aid of Figures and examples which, however, do not represent a restriction of the invention. Additional advantages and advantageous embodiments of the invention follow from the patent claims.

BRIEF DESCRIPTION OF THE DRAWINGS

FIG. 2a: A longitudinal section through a tube-shaped polymer energy absorber according to the invention, prior to a crash situation.

FIG. 2b: A longitudinal section through a tube-shaped polymer energy absorber according to the invention, following a crash situation.

FIG. 2c: A cross section through the tube-shaped polymer energy absorber showing its condition prior to a crash.

FIG. 2d: A cross section through the tube-shaped polymer energy absorber showing its condition after a crash.

FIG. 2e: A representation of the material penetration depth following the crash.

DETAILED DESCRIPTION

Figure 1:
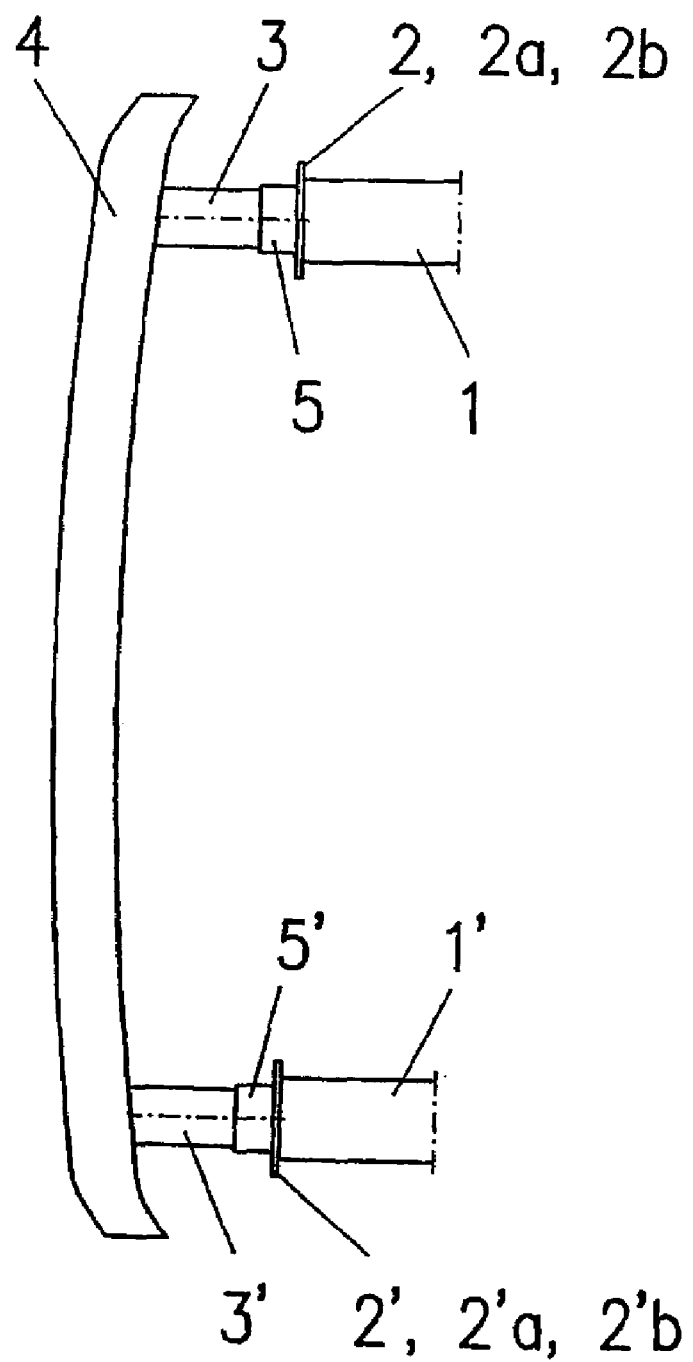
FIG. 1: A basic view of a bumper system with a tube-shaped polymer energy absorber according to the invention, installed in the frontal region of a motor vehicle.
Figure 6:
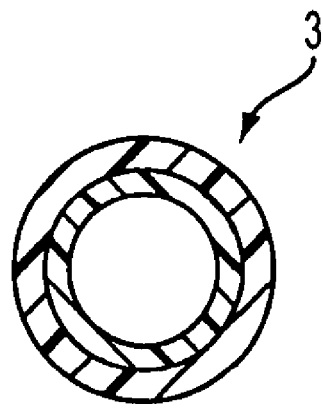
FIG. 6. shows an illustrative cross sectional view of a tube-shaped polymer energy absorber according to an embodiment having two polymer layers.
Figure 7:
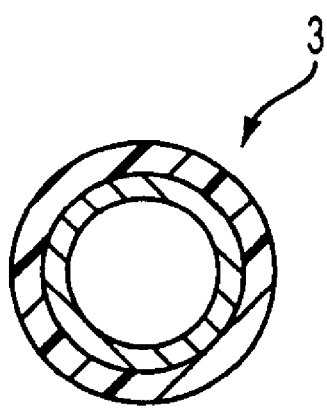
FIG. 7 shows an illustrative cross sectional view of a tube-shaped polymer energy absorber according to an embodiment having a metal inlay.
Figure 8:
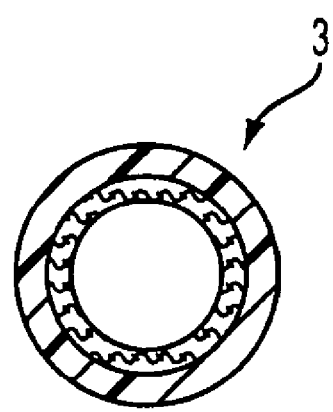
FIG. 8 shows an illustrative cross sectional view of a tube-shaped polymer energy absorber according to an embodiment having a textile reinforcement.

FIG. 1 shows a basic view of a bumper system with a tube-shaped polymer energy absorber according to the invention installed in the frontal region of a motor vehicle. The bumper system comprises a front bumper support 4 with two tube-shaped polymer energy absorbers 3, 3' attached to the ends of the front bumper support 4. Each tube-shaped polymer energy absorber 3, 3' is connected to a vehicle frame 1 by means of a metal base plate 2,2' with flange 2a, 2a' and chip-removing elements 2b, 2b' which are not shown in this detailing stage of the drawing. Once a specific critical force load is exceeded during a crash situation, material is removed in longitudinal direction of the surface from the tube-shaped polymer energy absorbers 3,3' by means of the chip-removing elements 2b, 2b' of the metal base plate 2,2'. In the process, energy is absorbed through the extensive removal of material by means of chip removal along the outside surface of the polymer energy absorber which can also be composed of several layers (see e.g. FIG. 6).

FIG. 2a shows a longitudinal section through a tube-shaped polymer energy absorber 3 with guide sleeve 5 prior to a crash situation. The tube-shaped polymer energy absorber 3 is here connected form-locking and frictionally adhering to a metal base plate 2 with flange 2a and chip-removing elements 2b and is additionally position-stabilized by means of a guide sleeve 5. FIG. 2b shows an end position following a crash for the tube-shaped polymer energy absorber 3 in the direction of the force effect caused by the crash. In the process, the tube-shaped polymer energy absorber 3 is displaced relative to the starting position by the distance Δs in the direction of the force effect, and the chip-removing elements 2b effectively remove material along the polymer surface by means of chip removal, e.g. as shown with the dashed chip-removal lines 6a-h. For a better understanding, FIG. 2c shows a cross section of a tube-shaped polymer energy absorber 3 in the condition prior to the crash while FIG. 2d shows the condition after the crash.

FIG. 2d shows a cross section through a preferred embodiment of the surface removal effected by eight chip-removing elements 2b. The Figure shows cross sections 6a-h for the tracks followed by the chip-removing elements as a result of the force effect due to a crash.

FIG. 2e shows that the material penetration depth Δd depends on the selected chip-removing elements 2b, their geometric form (see FIGS. 3a-h), and the polymer materials used.

Figure 9A:
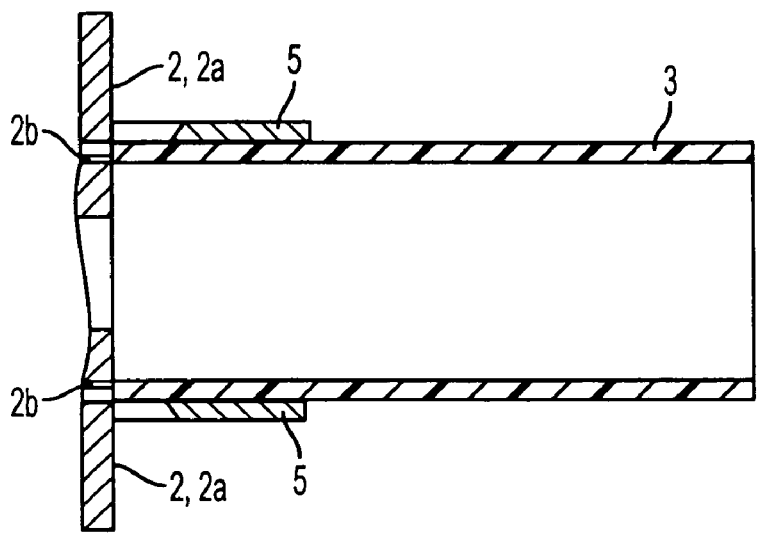
FIG. 9a shows an illustrative longitudinal section through a tube-shaped polymer energy absorber according to an embodiment of the invention, prior to a crash situation.
Figure 9B:
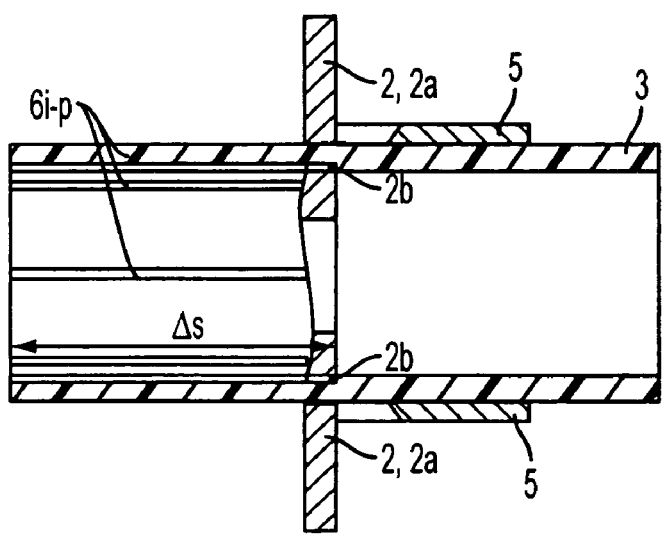
FIG. 9b shows an illustrative longitudinal section through the tube-shaped polymer energy absorber of FIG. 9a, following a crash situation.
Figure 9C:
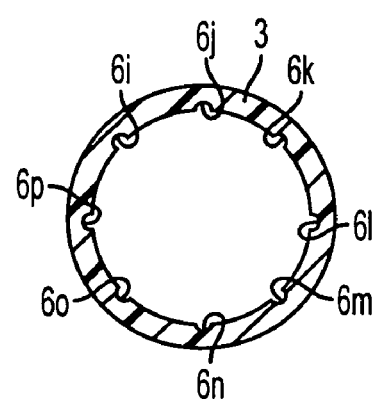
FIG. 9c shows an illustrative cross sectional view of the tube-shaped polymer energy absorber of FIGS. 9a and 9b showing its condition after a crash.

FIGS. 3a-d show different geometric forms for the chip-removing elements 2b, including semi-circular (FIG. 3a), rectangular (FIG. 3b), triangular (FIG. 3c), and polygonal (FIG. 3d), for removing chips from the external surface of a polymer energy absorber 3. FIGS. 3e-h show corresponding chip-removing elements 2b for the chip removal on the internal surface of the polymer energy absorber 3 (see FIGS. 9a, 9b, 9c). FIG. 9c shows an illustrative cross-sectional view of the energy absorber 3 depicting the surface removal effected by, for example, eight internally disposed chip-removing elements 2b according to an exemplary embodiment. FIG. 9c shows cross sections 6i-p for the tracks followed by the chip-removing elements 2b as a result of the force effect due to a crash. The length of the chip-removing elements 2b is determined in both cases, meaning for the internal and/or external arrangement, by the geometric form of the chip-removing elements and the material depth Δd which can be adjusted, so that in the event of a crash and given a removal angle of 45-90° for the chip-removing elements 2b the absorption of the crash energy is ensured depending on the selected tube wall thickness for the polymer energy absorber.

Figure 3A:
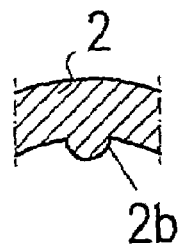
FIGS. 3a-h: Different geometric forms for chip-removing elements which can be arranged on the inside or outside.
Figure 3B:
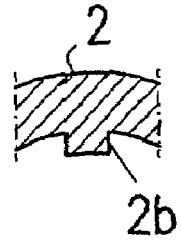
Figure 3C:
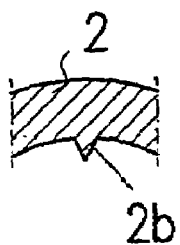
Figure 3D:
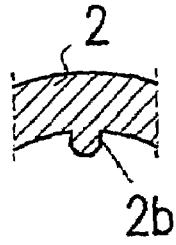
Figure 3E:
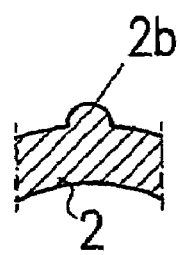
Figure 3F:
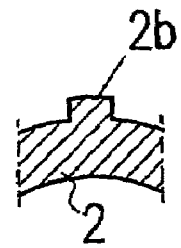
Figure 3G:
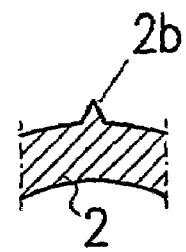
Figure 3H:
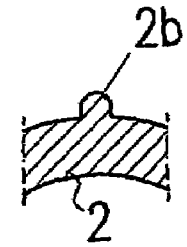
Figure 4:
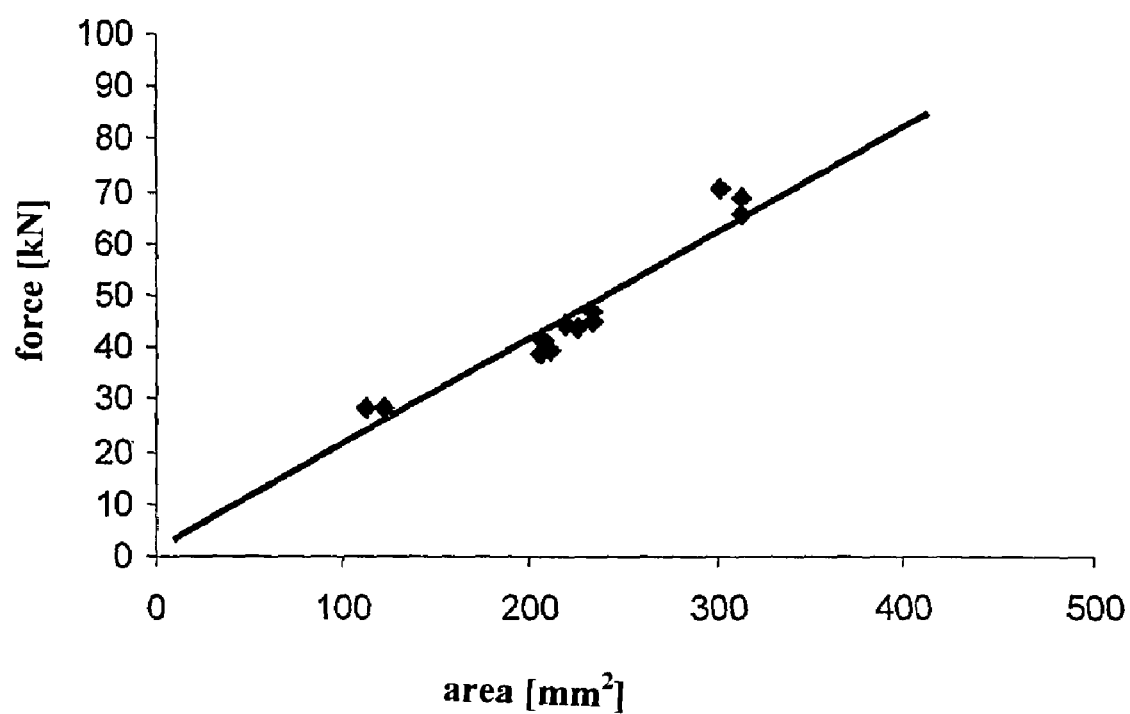
FIG. 4: A diagram showing the ratio of force to surface area for an energy absorber composed of polyamide material.

FIG. 4 shows an example of an experimentally determined ratio of force to surface area for an energy absorber of polymer material experiencing forces ranging from 0-90 kN and using chip-removing elements 2b, shown in FIG. 3a, in dependence on the surface area (from which material is removed). In the process, it has turned out that with an increasing force level, the area for the chip removal along the polymer surface of the energy absorber according to the invention will increase in linear direction.

Figure 5:
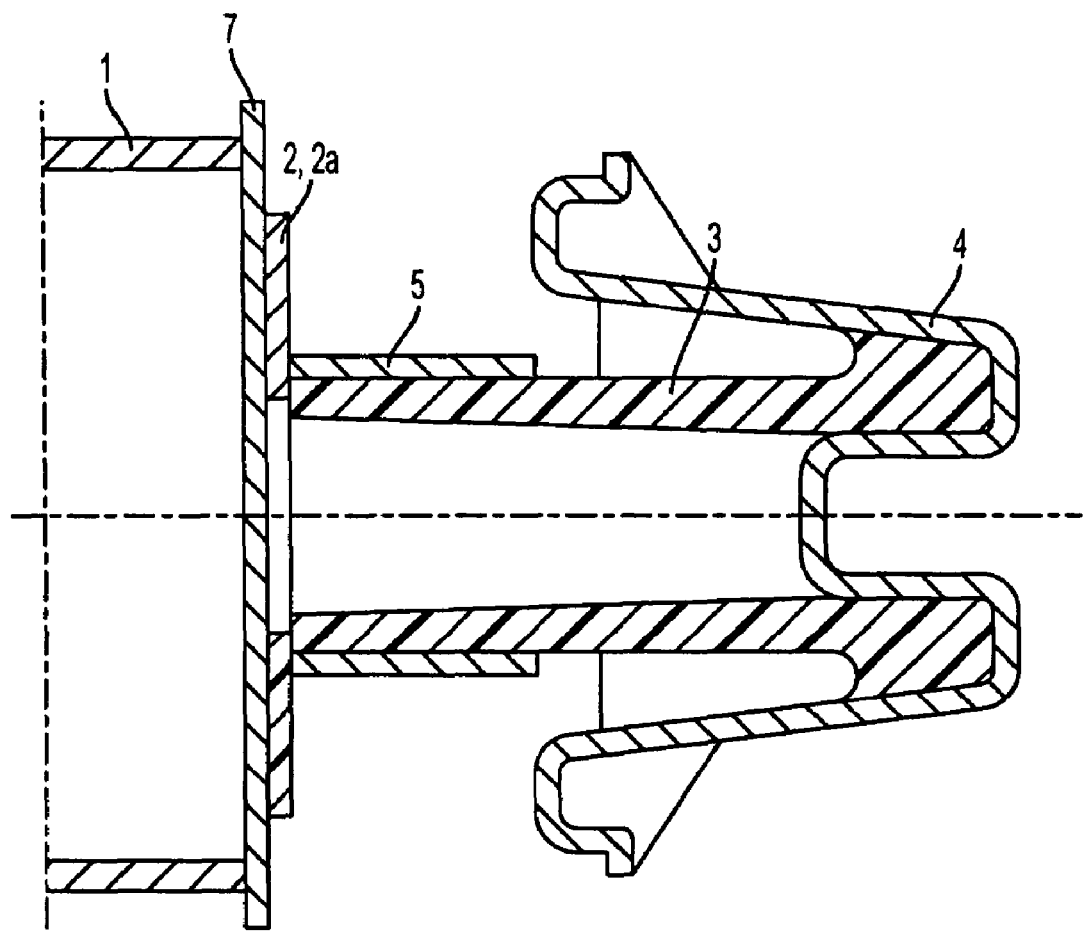
FIG. 5: A connection between the polymer energy absorber and a bumper system.

FIG. 5 shows an example of a form-locking and frictionally adhering connection between the polymer energy absorber 3 and a bumper support 4. The metal base plate 2 with flange 2a of the energy absorber 3 can be attached frictionally adhering to the frame side rail axis and/or to a preferred support structure of the motor vehicle, e.g. by means of fastening elements, wherein the opposite-arranged end of the polymer energy absorber is formed integrally onto the bumper support and can be formed on during the injection-molding of the bumper system, thereby resulting in a completely finished bumper system with polymer energy absorber.

FIGS. 1, 2a, b and 5 show embodiments of the guide sleeve 5, for example made of metal, which permits an axial movement of the polymer energy absorber as a result of the integral connection to the base plate 2 with flange 2a which is attached to the support structure 1 for a motor vehicle, and serves as momentary support against a force effect caused by a crash.

In principle, the invention is not limited to the illustrated and described exemplary embodiments, wherein it is conceivable for this invention to have an energy absorber fashioned completely from metal.

The invention claimed is:

1. A polymer energy absorber for motor vehicles, comprising:
   a polymer tube; and
   a metal base plate having a flange and defining an opening, the metal base plate including a plurality of chip-removing elements arranged around the opening, wherein the chip-removing elements are arranged to contact a surface of the polymer tube to provide for the absorption of energy through removal of a portion of the polymer tube surface during a crash.

2. The polymer energy absorber for motor vehicles as defined in claim 1, wherein the polymer tube is made from thermoplastic or duroplastic material adapted to the motor vehicle weight and the vehicle type.

3. The polymer energy absorber for motor vehicles as defined in claim 1, wherein the polymer tube is composed of one of the materials selected from the group consisting of polyvinyl chlorides (PVC), polyethylenes (PE), polypropylenes (PP), polyamides (PA), polycarbonates (PC), polyethylenterephthalates (PET), polybutylene-terephthalates (PBT), polymethylmethacryaltes (PMMA), polyoxymethylenes (POM), styrene copolymerisates, acryl-nitrile-styrene-butadien copolymer (ABS), copolymer from styrene and acrylonitrile, and blends thereof (ABS/PC and PBT/PC).

4. The polymer energy absorber for motor vehicles as defined in claim 1, wherein the polymer tube is composed of a high-performance polymer material selected from the group consisting of polyetherketones (PEK, PEEK), polyamides (PA) and copolymers thereof.

5. The polymer energy absorber for motor vehicles as defined in claim 1, wherein polymer blends are used as material for the polymer tube.

6. The polymer energy absorber for motor vehicles as defined in claim 3, wherein the polymer tube further comprises an admixture of inorganic filler materials selected from the group consisting of chalk, talcum, carbon fibers, glass fibers, mica, silicates, aluminum nitrite, aluminum silicate and metal micro-particles, for improving the mechanical stability and rigidity of the polymer tube.

7. The polymer energy absorber for motor vehicles as defined in claim 6, wherein the inorganic filler materials are present in the range of 3 to 40 percent by weight, relative to the mol weight of the polymer tube.

8. The polymer energy absorber for motor vehicles as defined in claim 3, wherein the polymer tube further comprises an admixture of nano-particle filler materials selected from the group consisting of $TiO_2$, soot, silicic acid and clay minerals, the nano-particle filler materials having particle sizes of 80-150 nm, at a share of 3-15 percent by weight, relative to the mol weight of the polymer tube.

9. The polymer energy absorber for motor vehicles as defined in claim 1, wherein an outer diameter of the polymer tube is in the range of 4 to 10 cm.

10. The polymer energy absorber for motor vehicles as defined in claim 1, wherein a wall thickness of the polymer tube ranges from 0.5 to 10 cm.

11. The polymer energy absorber for motor vehicles as defined in claim 1, wherein a total length of the polymer tube ranges from 35 to 200 mm for an energy absorption up to 20 kJ.

12. The polymer energy absorber for motor vehicles as defined in claim 11, wherein the total length of the polymer tube ranges from 100-170 mm depending on the space provided for installation in the motor vehicle, the amount of energy to be absorbed, and the dimensioning for a crash speed of up to 20 km/h.

13. The polymer energy absorber for motor vehicles as defined in claim 1, wherein the polymer tube comprises at least two layers of the same and/or different layer thickness and of identical and/or different polymer materials.

14. The polymer energy absorber for motor vehicles as defined in claim 2, wherein a density of the thermoplastic and/or duroplastic materials is in the range of 0.82 to 1.48 g/cm$^3$.

15. The polymer energy absorber for motor vehicles as defined in claim 13, wherein the polymer tube further comprises a metal inlay and/or a textile reinforcement to improve shearing force resistance.

16. The polymer energy absorber for motor vehicles as defined in claim 13, wherein the polymer tube further comprises a tubular basic body of metal coated with the at least two layers and the layers form energy-absorbing chip-removal layers.

17. The polymer energy absorber for motor vehicles as defined in claim 1, wherein a geometric cross-sectional shape of the polymer tube is one of circular, U-shaped, trapezoid, rectangular or elliptical.

18. The polymer energy absorber for motor vehicles as defined in claim 1, wherein the polymer tube is produced using an extrusion, co-extrusion and/or injection-molding technique.

19. The polymer energy absorber for motor vehicles as defined in claim 1, wherein energy absorption through material removal is achieved for crash speeds of up to 20 km/h in a longitudinal direction of the polymer tube due to the plurality of chip-removing elements which are connected frictionally to the polymer tube surface.

20. The polymer energy absorber for motor vehicles as defined in claim 1, wherein the number, geometric cross-sectional shape, and a cutting depth of the chip-removing elements are adjustable to alter the amount of energy absorption up to 20 kJ.

21. The polymer energy absorber for motor vehicles as defined in claim 1, wherein the chip-removing elements are adapted to have an energy-absorbing effect while moving along one or more of an inside surface of the polymer tube and an outside surface of the polymer tube.

22. The polymer energy absorber for motor vehicles as defined in claim 19, wherein the number of chip-removing elements ranges from 4 to 40.

23. The polymer energy absorber for motor vehicles as defined in claim 22, wherein the number of chip-removing elements is 8 to 16 arranged symmetrically and equidistant about the metal base plate opening.

24. The polymer energy absorber for motor vehicles as defined in claim 22, wherein spacing between individual chip-removing elements is in the range of 2.5 to 25%, relative to an outside and/or inside periphery of the polymer tube.

25. The polymer energy absorber for motor vehicles as defined in claim 1, wherein the chip-removing elements have a rectangular, triangular, trapezoid, polygonal, or semi-circular shape and form a chip-removing angle of 45-90 degrees relative to the normal of an outside and/or inside surface of the polymer tube.

26. The polymer energy absorber for motor vehicles as defined in claim 1, wherein a length of a chip-removing element is 0.5-3 cm depending on a wall thickness of the polymer tube and results in a material penetration depth $\Delta d$ of 0.15 to 1.5 cm.

27. The polymer energy absorber for motor vehicles as defined in claim 1, wherein metal, or metal alloys, or ceramics are used as material for the chip-removing elements.

28. The polymer energy absorber for motor vehicles as defined in claim 1, further comprising a guide sleeve attached integrally to the metal base plate to permit an axially guided movement of the polymer tube, and wherein the guide sleeve functions as momentary support in case of a crash.

29. A bumper system for motor vehicles, comprising at least two polymer energy absorbers as defined in claim 1.

30. The bumper system for motor vehicles as defined in claim 29, wherein the polymer energy absorbers are installed in front of a vehicle frame side rail, and wherein the polymer tubes are integrally connected to a bumper support and the flange of the metal base plate is connected to a vehicle frame part by fastening elements.

31. The bumper system for motor vehicles as defined in claim 29, wherein the energy absorber is connected integrally to a bumper support in a form-locking and material-to-material or form-locking and frictionally adhering manner.

32. The bumper system for motor vehicles as defined in claim 29, wherein the bumper system is disposed in a rear region of the motor vehicle.

33. An energy absorber for a motor vehicle, comprising:
a first element; and
a second element defining an opening arranged to receive the first element and including a plurality of chip-removing elements protruding within the opening, wherein the chip-removing elements are arranged to contact a surface of the first element and remove a portion of the surface to absorb energy when the first element is moved relative to the second element in a longitudinal direction during a crash of the motor vehicle.

* * * * *